United States Patent
Chen et al.

(10) Patent No.: US 10,216,253 B2
(45) Date of Patent: Feb. 26, 2019

(54) UNIVERSAL SERIAL BUS HUB AND CONTROL METHOD THEREOF

(71) Applicant: VIA Technologies, Inc., New Taipei (TW)

(72) Inventors: Yi-Te Chen, New Taipei (TW); Terrance Shiyang Shih, Milpitas, CA (US); Hsiao-Chyi Lin, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 609 days.

(21) Appl. No.: 14/138,151

(22) Filed: Dec. 23, 2013

(65) Prior Publication Data

US 2014/0298053 A1    Oct. 2, 2014

Related U.S. Application Data

(60) Provisional application No. 61/806,244, filed on Mar. 28, 2013, provisional application No. 61/862,896, filed on Aug. 6, 2013.

(30) Foreign Application Priority Data

Nov. 11, 2013    (TW) .............................. 102140907 A

(51) Int. Cl.
   *G06F 1/32*   (2006.01)
(52) U.S. Cl.
   CPC ............ *G06F 1/325* (2013.01); *G06F 1/3253* (2013.01); *G06F 1/3296* (2013.01); *Y02D 10/151* (2018.01); *Y02D 10/172* (2018.01)

(58) Field of Classification Search
None
See application file for complete search history.

(56) References Cited

U.S. PATENT DOCUMENTS

| | | | |
|---|---|---|---|
| 5,799,196 A | 8/1998 | Flannery | |
| 6,105,143 A | 8/2000 | Kim | |
| 6,345,364 B1 | 2/2002 | Lee | |
| 6,363,491 B1 * | 3/2002 | Endo | G06F 13/4063 713/310 |
| 8,742,624 B1 * | 6/2014 | Sagarwala | H02J 1/10 307/43 |
| 2001/0027530 A1 * | 10/2001 | Yen | G06F 1/3215 713/300 |

(Continued)

FOREIGN PATENT DOCUMENTS

| | | |
|---|---|---|
| CN | 1310402 | 8/2001 |
| CN | 1444150 | 9/2003 |

(Continued)

OTHER PUBLICATIONS

"Office Action of Taiwan Counterpart Application", dated Jul. 13, 2015, p. 1-p. 10.

(Continued)

*Primary Examiner* — Zahid Choudhury
(74) *Attorney, Agent, or Firm* — JCIPRNET

(57) ABSTRACT

A universal serial bus and a control method thereof are provided. Different voltages are respectively provided to circuit groups when a universal serial bus hub is in a suspend state and a normal working state, so as to reduce leakage current.

20 Claims, 2 Drawing Sheets

(56) References Cited

U.S. PATENT DOCUMENTS

| | | | | |
|---|---|---|---|---|
| 2002/0040444 | A1* | 4/2002 | Ohie | G06F 1/3203 713/322 |
| 2004/0103328 | A1* | 5/2004 | Ichien | G06F 1/3203 713/300 |
| 2006/0190748 | A1 | 8/2006 | Lim et al. | |
| 2010/0205339 | A1* | 8/2010 | Bohm | G06F 1/3203 710/106 |
| 2012/0144213 | A1 | 6/2012 | Chang et al. | |
| 2012/0290761 | A1* | 11/2012 | Chen | G06F 13/42 710/305 |
| 2014/0215234 | A1* | 7/2014 | Hayashi | G06F 1/32 713/310 |

FOREIGN PATENT DOCUMENTS

| | | |
|---|---|---|
| CN | 1549091 | 11/2004 |
| CN | 101021741 | 8/2007 |
| CN | 101299208 | 11/2008 |
| CN | 101308399 | 11/2008 |
| CN | 100487686 | 5/2009 |
| CN | 101454755 | 6/2009 |
| CN | 102200827 | 9/2011 |
| CN | 102339405 | 2/2012 |
| CN | 102577021 | 7/2012 |
| CN | 102645965 | 8/2012 |
| CN | 202602976 | 12/2012 |
| CN | 102856933 | 1/2013 |
| CN | 102866768 | 1/2013 |
| CN | 102981997 | 3/2013 |
| KR | 20040006255 | 1/2004 |
| TW | 201109929 | 3/2011 |

OTHER PUBLICATIONS

"Office Action of China Counterpart Application", dated Dec. 30, 2015, p. 1-p. 9.

"Office Action of China Counterpart Application", dated Aug. 8, 2016, p. 1-p. 7.

* cited by examiner

UNIVERSAL SERIAL BUS HUB AND CONTROL METHOD THEREOF

CROSS-REFERENCE TO RELATED APPLICATION

This application claims the priority benefits of U.S. Provisional Application Ser. No. 61/806,244, filed on Mar. 28, 2013, U.S. Provisional Application Ser. No. 61/862,896, filed on Aug. 6, 2013, and Taiwan application Ser. No. 102140907, filed on Nov. 11, 2013. The entirety of each of the above-mentioned patent applications is hereby incorporated by reference herein and made a part of specification.

BACKGROUND

Technical Field

The invention relates to an electronic apparatus. Particularly, the invention relates to a universal serial bus hub and a control method thereof.

Related Art

Presently, the most commonly used hot-plugging interfaces of computers in the market are universal serial bus (USB) interfaces. Most of USB interface external devices are connected to the computers through a USB2.0 interface. Along with development of technology, specification of the USB is also developed from USB2.0 to USB3.0. Compared to a transmission rate of 480 Mbps of the conventional USB2.0, the transmission rate of the USB3.0 may reach 5 G bps, which greatly increases a data transmission speed.

Regarding the specification of the USB, a current limitation of the USB is not specifically defined. Generally, a core voltage provided in a USB2.0 hub is 3.3V, and a core voltage provided in USB3.0 hub under a suspend state or a normal working state is 1-1.5V. Since the USB hub of the current technique provides a fixed core voltage under the suspend state and the normal working state, current leakage is probably occurred under the suspend state, which may cause unnecessary power consumption.

SUMMARY

The invention is directed to a control apparatus and an operation method thereof, by which power consumption of a universal serial bus (USB) hub is reduced.

The invention provides a USB hub, which is coupled to a host or another USB hub through a USB bus. The USB hub includes a control unit, a core circuit group and a voltage conversion unit, where the control unit detects signals on the USB to determine whether the USB hub enters a suspend state. The core circuit group is coupled to the control unit. The conversion unit is coupled to the control unit and the core circuit group, and is controlled by the control unit to produce a normal working voltage when the USB hub is in a normal working state, and produce a first suspend voltage when the USB hub is in the suspend state. The core circuit group receives the first suspend voltage under the suspend state, where the first suspend voltage is lower than the normal working voltage.

The invention provides a control method of a USB hub, where the USB hub is coupled to a host or another USB hub through a USB bus. The control method of the USB hub includes following steps. Signals on the USB bus are detected to determine whether the USB hub enters a suspend state. When the USB hub is in a normal working state, a voltage conversion unit is controlled to produce a normal working voltage. When the USB hub is in the suspend state, the voltage conversion unit is controlled to produce a first suspend voltage, where a core circuit group receives the first suspend voltage under the suspend state. The first suspend voltage is lower than the normal working voltage, and the voltage conversion unit is built in the USB hub.

According to the above descriptions, different voltages are respectively provided to the circuit group when the USB hub is in the suspend state and the normal working state, so as to reduce leakage current, and reduce power consumption of the USB hub.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
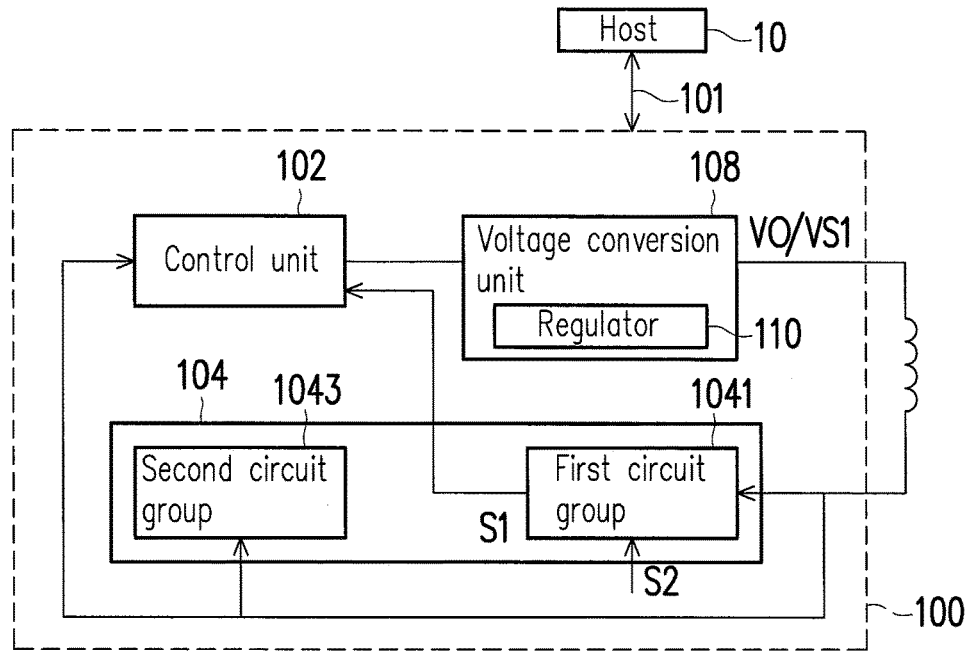
FIG. 1 is a schematic diagram of a universal serial bus (USB) hub according to an embodiment of the invention.

FIG. 1 is a schematic diagram of a universal serial bus (USB) hub according to an embodiment of the invention. Referring to FIG. 1, the USB hub 100 includes a control unit 102, a core circuit group 104 and a voltage conversion unit 108, where the control unit 102 is coupled to the core circuit group 104 and the voltage conversion unit 108, and the voltage conversion unit 108 is further coupled to the core circuit group 104. Specification of the USB hub 100 is, for example, USB2.0 or USB3.0. The core circuit group 104 is a core circuit of the USB hub 100, and different to an input/output (I/O) circuit (not shown), a supply voltage of the core circuit is lower than a supply voltage of the I/O circuit. For example, in the USB hub 100 of the USB 3.0 specification, under a normal working state, the supply voltage of the I/O circuit is 3.3V, and the supply voltage of the core circuit is 1.XV (1.0-1.5V), and the supply voltage of the core circuit group 104 is determined by the manufacturing process of the USB hub 100. Taking an 80 nm manufacturing process as an example, the supply voltage of the core circuit group 104 under the normal working state is 1.2V. The control unit 102 can be coupled to a host 10 or another USB hub (not shown) through a USB bus 101, and detects signals on the USB bus 101 to determine whether the USB hub 100 enters a suspend state. For example, when the specification of the USB hub 100 is the USB2.0, the control unit 102 can detect a specific pattern defined in a mechanism of a handshake protocol transmitted on the USB bus 101 to determine whether the USB hub 100 enters the suspend state, and when the specification of the USB hub 100 is the USB3.0, the control unit 102 can detect a prompt signal on the USB bus 101 that is transmitted from the host 10 or the other USB hub (not shown) to determine whether the USB hub 100 enters the suspend state.

When the control unit 102 determines that the USB hub 100 is in the normal working state, the control unit 102 controls the voltage conversion unit 108 to produce a normal working voltage VO to the control unit 102 and the core circuit group 104, so as to provide the core voltage required by the control unit 102 and the core circuit group 104 to keep operating, where the normal working voltage VO is, for example, 1.2V, though the invention is not limited thereto.

When the control unit 102 determines that the USB hub 100 is about to enter the suspend state, the control unit 102 controls the voltage conversion unit 108 to produce a first suspend voltage VS1, where the first suspend voltage VS1 is lower than the normal working voltage VO. The core circuit group 104 receives the first suspend voltage VS1 under the suspend state, and in an embodiment, the core circuit group 104 includes a first circuit group 1041 required to be operated under the suspend state, and the first circuit group 1041 includes but is not limited to, for example, a signal receiving detecting circuit, a remote wakeup circuit and a low frequency period signal (LFPS) detecting circuit, etc. Under the suspend state, the control unit 102 and the first circuit group 1041 can still execute basic operations according to the first suspend voltage VS1, and the first suspend voltage VS1 is, for example, 1.0V, though the invention is not limited thereto, and the first suspend voltage VS1 is greater than or equal to the lowest operation voltage of the first circuit group 1041. In an embodiment, the first suspend voltage VS1 can be the lowest operation voltage that is capable of maintaining basic operations of the control unit 102 and the first circuit group 1041, and it is determined by the manufacturing process, and the first suspend voltage VS1 can be different under different manufacturing process conditions. The core circuit group 104 further includes a second circuit group 1043, which is unnecessary to be operated under the suspend state, and the second circuit group 1043 includes but is not limited to, for example, a circuit used for processing data transmission, such as an ePHY circuit of a data transceiving (TRX) module. Under the suspend state, the first suspend voltage VS1 cannot drive the second circuit group 1043 to normally operate, i.e. the first suspend voltage VS1 is lower than the lowest operation voltage of the second circuit group 1043.

As that described above, by providing the suspend voltage lower than the normal working voltage VO to the core circuit group 104 under the suspend state, generation of a leakage current is reduced, and power consumption is greatly reduced. The circuit of an advanced manufacturing process (<90 nm) may produce the leakage current under the suspend state, and according to the present invention, the leakage current is reduced by reducing the voltage provided under the suspend state, and since the power consumption is directly proportional to a square of the voltage, the power consumption of the USB hub 100 is decreased squarely. Meanwhile, the suspend voltage can maintain basic operation of the circuit (the first circuit group 1041) required to be continually operated under the suspend state of the USB hub 100, so as to maintain the functions under the suspend state.

For example, when the user wakes up the USB hub 100, the first circuit group 1041 can receive a wakeup signal S2, and sends a notification signal Si to the control unit 102 according to the wakeup signal 102, and the control unit 102 controls the voltage conversion unit 108 to output the normal working voltage VO to the control unit 102, the first circuit group 1042 and the second circuit group 1043 to enter the normal working state, so as to execute integral functions thereof, where the wakeup signal S2 can be triggered by a mouse or a keyboard.

Furthermore, in an embodiment, the voltage conversion unit 108 in the USB hub 100 of FIG. 1 may include a regulator 110, where the regulator 110 is coupled to the control unit 102 and the core circuit group 104. In an embodiment, the regulator 110 is controlled by the control unit 102 to output the normal working voltage VO or the first suspend voltage VS1 to an external inductor through a first output pin of the USB hub 100, and the external inductor is located outside the USB hub 100. The USB hub 100 further includes a first input pin, which is coupled to the core circuit group 104, and receives the normal working voltage VO or the first suspend voltage VS1 through the external inductor.

It should be noticed that the USB hub 100 is, for example, implemented on a chip, and the voltage conversion unit 108 can be configured in internal of the USB hub 100.

Figure 2:
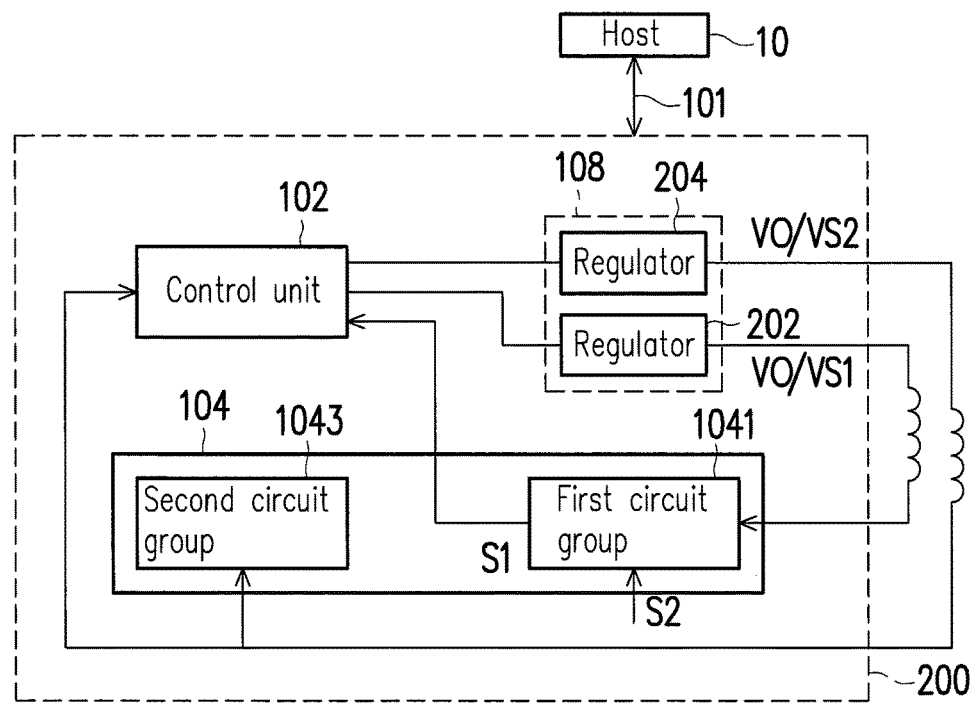
FIG. 2 is a schematic diagram of a USB hub according to another embodiment of the invention.

FIG. 2 is a schematic diagram of a USB hub according to another embodiment of the invention. Modules of FIG. 2 with the same referential numbers have the same functions and operations as that of FIG. 1, which are not repeated. When the control unit 102 determines that the USB hub 200 is in the normal working state, the control unit 102 controls the voltage conversion unit 108 to produce the normal working voltage VO to the control unit 102, the first circuit group 1041 and the second circuit group 1043, so as to provide the power required for operations of the control unit 102, the first circuit group 1041 and the second circuit group 1043, where the normal working voltage VO is, for example, 1.2V, though the invention is not limited thereto. Different to the embodiment of FIG. 1, when the control unit 102 determines that the USB hub 200 is about to enter the suspend state, the control unit 102 controls the voltage conversion unit 108 to produce the first suspend voltage VS1 and a second suspend voltage VS2, where the second suspend voltage VS2 is lower than the first suspend voltage VS1. The first circuit group 1041 and the second circuit group 1043 respectively receive the first suspend voltage VS1 and the second suspend voltage VS2 under the suspend state, where the first circuit group 1041 may include a circuit required to be operated under the suspend state, for example, a signal receiving detecting circuit, a remote wakeup circuit and a LFPS detecting circuit, etc. Under the suspend state, the control unit 102 and the first circuit group 1041 can still execute basic operations according to the first suspend voltage VS1. Moreover, the second circuit group 1043 may include circuits that are unnecessary to be operated under the suspend state, for example, a circuit used for processing data transmission. In the embodiment of FIG. 2, the second suspend voltage VS2 provided to the second circuit group 1043 under the suspend state is lower than the first suspend voltage VS1, so as to further decrease the power consumption, where the second suspend voltage is, for example, 0.7V, though the invention is not limited thereto. In an embodiment, the second suspend voltage VS2 can be a lowest voltage capable of waking up the second circuit group 1043 from the suspend state, which is determined by the manufacturing process, and the second suspend voltage VS2 can be different under different manufacturing process conditions, and the second suspend voltage VS2 can be a even lower voltage or a voltage of 0V.

In the embodiment of FIG. 2, by dividing the circuit into the first circuit group 1041 and the second circuit group 1043 and providing different suspend voltages to the first circuit group 1041 and the second circuit group 1043 under the suspend state, the suspend voltage of the second circuit group 1043 that is unnecessary to be operated is further decreased, so as to reduce generation of the leakage current, and greatly reduce the power consumption. Moreover, by providing the first suspend voltage VS1 that is lower than the normal working voltage VO to the control unit 102 and the first circuit group 1041, the basic functions of the USB hub 100 required under the suspend state are maintained.

Further, in an embodiment, the voltage conversion unit 108 in the USB hub 200 of FIG. 2 may include a regulator 202 and a regulator 204, where the regulator 202 is coupled to the control unit 102 and the first circuit group 1041, and the regulator 204 is coupled to the control unit 102 and the second circuit group 1043. In an embodiment, the regulator 202 is controlled by the control unit 102 to output the normal working voltage VO or the first suspend voltage VS1 to an external inductor through a first output pin of the USB hub 200, and the external inductor is located outside the USB hub 200. The USB hub 200 further includes a first input pin, which is coupled to the first circuit group 1041, and receives the normal working voltage VO or the first suspend voltage VS1 through the external inductor. The regulator 204 is controlled by the control unit 102 to output the normal working voltage VO or the second suspend voltage VS2 to another external inductor through a second output pin of the USB hub 200. The USB hub 200 further includes a second input pin, which is coupled to the second circuit group 1043, and receives the normal working voltage VO or the second suspend voltage VS2 through the another external inductor.

In other embodiments, the voltage conversion unit 108 may only include one regulator 202 and a switching unit (not shown), where the switching unit is coupled to the control unit 102 and the second circuit group 1043, and is controlled by the control unit 102 to provide the normal working voltage VO output by the regulator 202 to the second circuit group 1043 when the USB hub 200 is in the normal working state, and provide the second suspend voltage VS2 input through a second input pin of the USB hub 200 to the second circuit group 1043 under the suspend state, where the second suspend voltage VS2 comes from a motherboard (not shown), which is input through the second input pin.

Now, pros and cons of the embodiments of FIG. 1 and FIG. 2 are discussed below. Compared to the embodiment of FIG. 2, in the embodiment of FIG. 1, the same suspend voltage VS1 is provided to the first circuit group 1041 and the second circuit group 1043, by which although the power consumption thereof is higher compared to that of the embodiment of FIG. 2, as the voltage conversion unit 108 is only required to output one suspend voltage, only one output pin and one input pin of the USB hub 100 are occupied. In the embodiment of FIG. 2, more output pins and input pins are occupied, though the leakage current and the power consumption are further decreased. The embodiments of FIG. 1 and FIG. 2 can be flexibly selected according to a design requirement.

Figure 3:
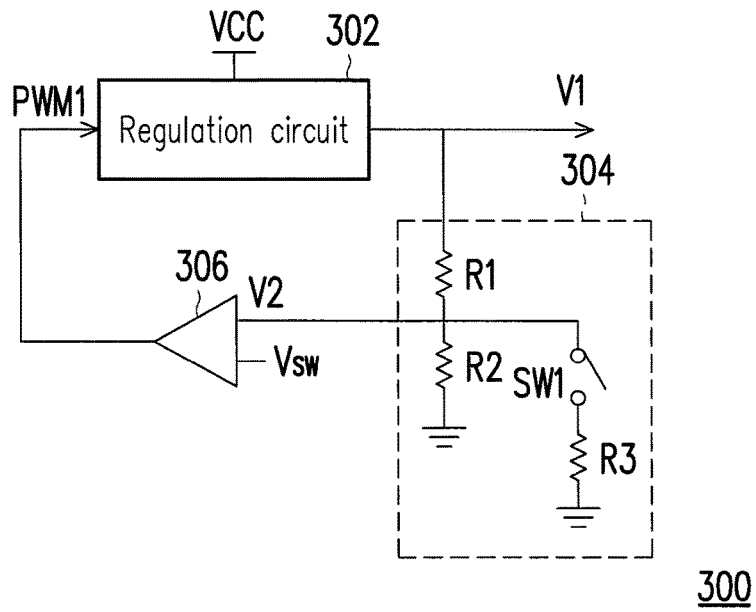
FIG. 3 is a schematic diagram of a regulator according to an embodiment of the invention.

FIG. 3 is a schematic diagram of a regulator according to an embodiment of the invention. Referring to FIG. 3, in detail, implementation of the regulator 110, the regulator 202 and the regulator 204 can be as that shown in FIG. 3. The regulator 300 includes a regulation circuit 302, a voltage-dividing unit 304 and a comparator 306. The regulation circuit 302 is coupled to a reference voltage VCC and an output terminal of the comparator 306, an input terminal of the comparator 306 is coupled to the voltage-dividing unit 304, and another input terminal thereof receives a sawtooth signal Vsw, and the voltage-dividing unit 304 is further coupled to an output terminal of the regulation circuit 302.

The voltage-dividing unit 304 is used for dividing a regulated voltage V1 (i.e. the aforementioned normal working voltage VO, the first suspend voltage VS1 or the second suspend voltage VS2) output by the regulation circuit 302 to produce a voltage-dividing signal V2 to the comparator 306. The comparator 306 compares the voltage-dividing signal V2 with the sawtooth signal Vsw to produce a pulse width modulation (PWM) signal PWM1 to the regulation circuit 302, and the regulation circuit 302 regulates the reference voltage VCC according to the PWM signal PWM1 to generate the regulated voltage V1, where the regulation circuit 302 can be a buck circuit, a boost circuit or a buck/boost circuit.

In detail, the voltage-dividing unit 304 may include resistors R1-R3 and a switch SW1, where the resistors R1 and R2 are connected in series between the output terminal of the regulation circuit 302 and the ground, and the switch SW1 and the resistor R3 are connected in series between a common node of the resistors R1 and R2 and the ground. The switch SW1 is controlled by the control unit 102. By turning on/off the switch SW1, the regulation circuit 302 is controlled to output the normal working voltage or the suspend voltage.

Figure 4:
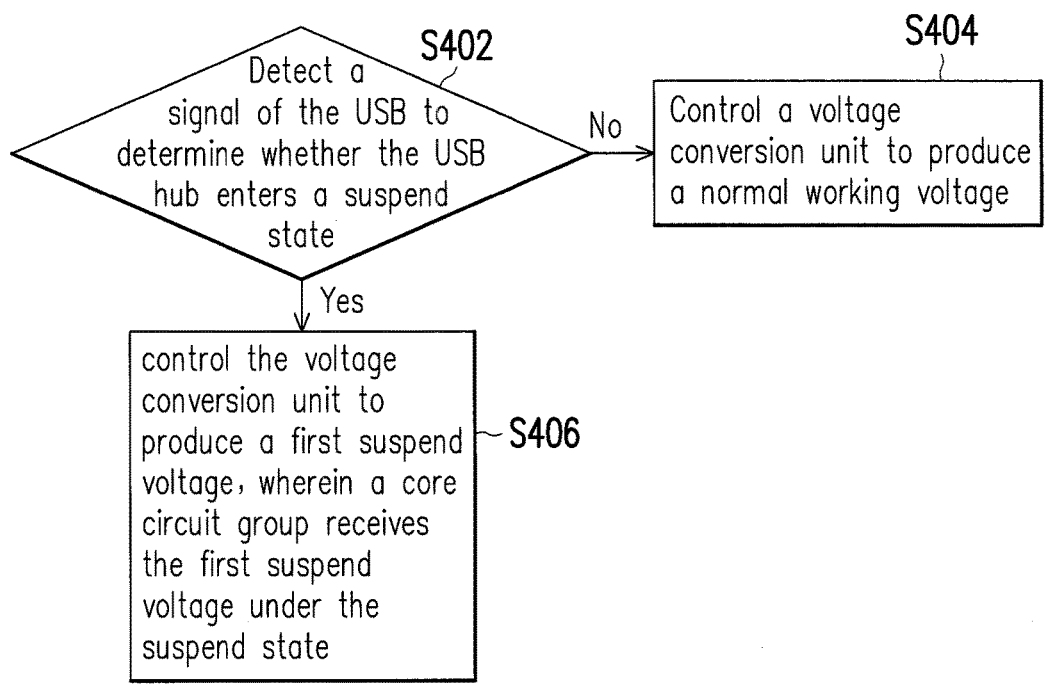
FIG. 4 is a flowchart illustrating a control method of a USB hub according to an embodiment of the invention.

FIG. 4 is a flowchart illustrating a control method of a USB hub according to an embodiment of the invention. The USB hub is coupled to a host or another USB hub through a USB. The control method of the USB hub includes following steps. First, signals on the USB bus is detected to determine whether the USB hub enters a suspend state (S402). When the USB hub is in a normal working state, a voltage conversion unit is controlled to produce a normal working voltage (step S404). Comparatively, when the USB hub is in the suspend state, the voltage conversion unit is controlled to produce a first suspend voltage, where a core circuit group receives the first suspend voltage under the suspend state (step S406). The first suspend voltage is lower than the normal working voltage, and the first suspend voltage is lower than a lowest operation voltage of the second circuit group.

In summary, different voltages are respectively provided to different circuit groups when the USB hub is in the suspend state, so as to reduce leakage current, such that not only power consumption of the USB hub is reduced, but also increasing of extra manufacturing cost is avoided.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A universal serial bus (USB) hub, coupled to a host or another USB hub through a USB bus, and the USB hub comprising:
   a control unit, detecting signals on the USB bus to determine whether the USB hub enters a suspend state;
   a core circuit group, coupled to the control unit; and
   a voltage conversion unit, built in the USB hub, and coupled to the control unit and the core circuit group of the USB hub, and controlled by the control unit to produce a normal working voltage when the USB hub is in a normal working state, and change the normal working voltage to a first suspend voltage when the USB hub is in the suspend state, wherein the core circuit group of the USB hub receives the first suspend voltage under the suspend state, and the first suspend voltage is lower than the normal working voltage, wherein the core circuit group of the USB hub further comprises a first circuit group and a second circuit group, the first circuit group comprises a core circuit required to be operated under the suspend state, and the second circuit group comprises a core circuit that is unnecessary to be operated under the suspend state, wherein the first suspend voltage which is lower than a lowest operation voltage of the second circuit group and greater than or equal to a lowest operation voltage of the first circuit group is provided to both of the first circuit group and the second circuit group during the suspend state.

2. The USB hub as claimed in claim 1, wherein when the core circuit group of the USB hub receives a wakeup signal under the suspend state, the core circuit group of the USB hub notifies the control unit according to the wakeup signal to control the voltage conversion unit to output the normal working voltage to the core circuit group of the USB hub.

3. The USB hub as claimed in claim 2, wherein the wakeup signal is triggered by a mouse or a keyboard.

4. The USB hub as claimed in claim 1, further comprising:
a first regulator, coupled to the control unit and the core circuit group of the USB hub, and controlled by the control unit to output the normal working voltage or the first suspend voltage;
a first output pin, coupled to the first regulator, and outputting the normal working voltage or the first suspend voltage to an external inductor; and
a first input pin, coupled to the core circuit group of the USB hub, and receiving the normal working voltage or the first suspend voltage through the external inductor.

5. The USB hub as claimed in claim 4, wherein the first regulator comprises:
a regulation circuit, coupled to a reference voltage, and regulating the reference voltage according to a pulse width modulation signal for outputting the normal working voltage or the first suspend voltage;
a voltage-dividing unit, coupled to an output terminal of the regulation circuit, and controlled by the control unit to divide an output voltage of the regulation circuit to produce a voltage-dividing signal; and
a comparator, having an input terminal coupled to the voltage-dividing unit, and an output terminal coupled to an input terminal of the regulation circuit, wherein the comparator compares the voltage-dividing signal with a sawtooth signal to produce the pulse width modulation signal to the regulation circuit.

6. The USB hub as claimed in claim 5, wherein the voltage-dividing unit comprises:
a first resistor, having a first terminal and a second terminal respectively coupled to the output terminal of the regulation circuit and a common node;
a second resistor, having a first terminal and a second terminal respectively coupled to the common node and a second reference voltage;
a third resistor; and
a switch, connected in series with the third resistor between the common node and the second reference voltage, wherein a conducting state of the switch is controlled by the control unit for controlling the regulation circuit to output the normal working voltage or the first suspend voltage.

7. The USB hub as claimed in claim 1, wherein when a specification of the USB hub is USB2.0, the control unit detects a specific pattern defined in a mechanism of a handshake protocol transmitted on the USB bus to determine whether the USB hub enters the suspend state; and when the specification of the USB hub is USB3.0, the control unit detects a prompt signal on the USB bus that is transmitted from the host or the other USB hub to determine whether the USB hub enters the suspend state.

8. The USB hub as claimed in claim 1, wherein the voltage conversion unit is controlled by the control unit to further produce a second suspend voltage when the USB hub is in the suspend state, the second circuit group receives the second suspend voltage under the suspend state, and the first circuit group receives the first suspend voltage under the suspend state, wherein the second suspend voltage is lower than the first suspend voltage.

9. The USB hub as claimed in claim 8, further comprising:
a second regulator, coupled to the control unit and the second circuit group, and controlled by the control unit to output the normal working voltage or the second suspend voltage;
a second output pin, coupled to the second regulator, and outputting the normal working voltage or the second suspend voltage to an external inductor; and
a second input pin, receiving the normal working voltage or the second suspend voltage through the external inductor.

10. The USB hub as claimed in claim 8, further comprising:
a second input pin, receiving the second suspend voltage from a motherboard; and
a switching unit, coupled to the control unit and the second circuit group, and controlled by the control unit to provide the normal working voltage to the second circuit group when the USB hub is in the normal working state, and provide the second suspend voltage to the second circuit group when the USB hub is in the suspend state.

11. The USB hub as claimed in claim 1, wherein only the first suspend voltage is used to suspend an operation of the core circuit of the second circuit group during the suspend state.

12. A control method of a USB hub, wherein the USB hub is coupled to a host or another USB hub through a USB bus, the control method of the USB hub comprising:
detecting signals on the USB bus to determine whether the USB hub enters a suspend state;
controlling a voltage conversion unit to produce a normal working voltage when the USB hub is in a normal working state; and
controlling the voltage conversion unit to change the normal working voltage to a first suspend voltage when the USB hub is in the suspend state, wherein the core circuit group of the USB hub receives the first suspend voltage under the suspend state,
wherein the first suspend voltage is lower than the normal working voltage, and the voltage conversion unit is built in the USB hub,
wherein the core circuit group of the USB hub further comprises a first circuit group and a second circuit group, the first circuit group comprises core circuits required to be operated under the suspend state, and the second circuit group comprises core circuits that are unnecessary to be operated under the suspend state, wherein the first suspend voltage which is lower than a lowest operation voltage of the second circuit group and greater than or equal to a lowest operation voltage of the first circuit group is provided to both of the first circuit group and the second circuit group during the suspend state.

13. The control method of a USB hub as claimed in claim 12, further comprising,
controlling the voltage conversion unit to produce a second suspend voltage when the USB hub is in the suspend state, the second circuit group receives the second suspend voltage under the suspend state, and the first circuit group receives the first suspend voltage under the suspend state.

14. The control method of a USB hub as claimed in claim 13, wherein the second suspend voltage is lower than the first suspend voltage.

15. The control method of a USB hub as claimed in claim 13, wherein the second suspend voltage is lower than the lowest operation voltage of the second circuit group and the lowest operation voltage of the first circuit group.

16. The control method of a USB hub as claimed in claim 12, wherein when the core circuit group of the USB hub receives a wakeup signal under the suspend state, the core circuit group of the USB hub notifies a control unit according to the wakeup signal to control the voltage conversion unit to output the normal working voltage to the core circuit group of the USB hub.

17. The control method of a USB hub as claimed in claim 12, wherein the wakeup signal is triggered by a mouse or a keyboard.

18. The control method of a USB hub as claimed in claim 12, wherein when a specification of the USB hub is USB2.0, detecting a specific pattern defined in a mechanism of a handshake protocol transmitted on the USB bus to determine whether the USB hub enters the suspend state.

19. The control method of a USB hub as claimed in claim 12, wherein when the specification of the USB hub is USB3.0, detecting a prompt signal on the USB bus that is transmitted from the host or the other USB hub to determine whether the USB hub enters the suspend state.

20. The control method of a USB hub as claimed in claim 12, wherein only the first suspend voltage is used to suspend an operation of the core circuit of the second circuit group during the suspend state.

* * * * *